United States Patent
Chang et al.

(10) Patent No.: US 9,384,125 B2
(45) Date of Patent: Jul. 5, 2016

(54) METHOD FOR ACCESSING FLASH MEMORY HAVING PAGES USED FOR DATA BACKUP AND ASSOCIATED MEMORY DEVICE

(71) Applicant: Silicon Motion Inc., Hsinchu County (TW)

(72) Inventors: Hsiao-Te Chang, Hsinchu County (TW); Chun-Yi Chen, Chiayi (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 366 days.

(21) Appl. No.: 13/920,074

(22) Filed: Jun. 17, 2013

(65) Prior Publication Data

US 2013/0339584 A1   Dec. 19, 2013

Related U.S. Application Data

(60) Provisional application No. 61/660,825, filed on Jun. 18, 2012.

(30) Foreign Application Priority Data

May 28, 2013 (TW) .............................. 102118811 A

(51) Int. Cl.
  *G06F 12/02* (2006.01)
(52) U.S. Cl.
  CPC .... *G06F 12/0246* (2013.01); *G06F 2212/1032* (2013.01)

(58) Field of Classification Search
  CPC . G06F 12/0246; G06F 12/16; G06F 11/1048; G06F 11/1068; G06F 11/1435; G06F 2212/1032
  See application file for complete search history.

(56) References Cited

U.S. PATENT DOCUMENTS

| | | | |
|---|---|---|---|
| 2010/0005229 A1* | 1/2010 | Hsiao | 711/103 |
| 2010/0115188 A1 | 5/2010 | Lee | |
| 2012/0005558 A1* | 1/2012 | Steiner et al. | 714/773 |
| 2012/0198123 A1* | 8/2012 | Post | G06F 11/1435 711/103 |
| 2013/0117606 A1* | 5/2013 | Anholt et al. | 714/15 |

FOREIGN PATENT DOCUMENTS

| | | |
|---|---|---|
| CN | 101127004 A | 2/2008 |
| CN | 101620575 A | 1/2010 |
| CN | 102298543 A | 12/2011 |
| TW | 504692 | 10/2002 |
| TW | 201003399 | 1/2010 |
| TW | 201122816 | 7/2011 |
| TW | 201207857 | 2/2012 |

* cited by examiner

*Primary Examiner* — Kevin Verbrugge
*Assistant Examiner* — Rocio Del Mar Perez-Velez
(74) *Attorney, Agent, or Firm* — Winston Hsu; Scott Margo

(57) ABSTRACT

The present invention provides a method for accessing a flash memory, where a block of the flash memory includes pages whose quantity is $(2^N+M)$, N and M are positive integers. The method includes: writing a data stream into $1^{st}$-$(2^N)^{th}$ pages, and backing up data of a portion of the $1^{st}$-$(2^N)^{th}$ pages into $(2^N+1)^{th}$-$(2^N+M)^{th}$ pages.

4 Claims, 5 Drawing Sheets

METHOD FOR ACCESSING FLASH MEMORY HAVING PAGES USED FOR DATA BACKUP AND ASSOCIATED MEMORY DEVICE

CROSS REFERENCE TO RELATED APPLICATIONS

This application claims the benefit of U.S. provisional application No. 61/660,825, filed on Jun. 18, 2012 and incorporated herein by reference.

BACKGROUND OF THE INVENTION

1. Field of the Invention

The disclosed embodiments of the present invention relate to a method for accessing a flash memory, and more particularly, to a method for backing up a portion of data stored in the flash memory and related memory device.

2. Description of the Prior Art

In some of flash memory designs, especially Triple-Level Cell (TLC) flash memories, the number of pages in each of blocks does not exactly equal power of two. However, a block usually exploits $2^N$ pages for data access in respect of the design and access speed of the flash memory controller. For instance, supposing a block possesses 258 pages, only the first 256 ($2^8$) pages are actually utilized for storing data, and the last two pages are left unused. That is to say, capacity of the last two pages is wasted.

SUMMARY OF THE INVENTION

Therefore, one of the objectives of the present invention is to provide a method for accessing a flash memory, so as to exploit the originally unused pages for backing up data. Therefore, the issue of page wasting in the prior art can be solved.

According to an embodiment of the present invention, a method for accessing a flash memory is disclosed, wherein a block of the flash memory includes $(2^N+M)$ pages, and both of N and M are positive integers. The method comprises: writing a data stream into $1^{st}$-$(2^N)^{th}$ pages; and backing up data of a portion of the $1^{st}$-$(2^N)$ to pages into $(2^N+1)^{th}$-$(2^N+M)^{th}$ pages.

According to another embodiment of the present invention, a memory device is disclosed. The memory device includes a flash memory and a controller. The flash memory includes a plurality of blocks, and each of the blocks including $(2^N+M)$ pages, wherein both of N and M are positive integers. The controller is arranged for writing a data stream into $1^{st}$-$(2^N)^{th}$ pages, and backing up data of a portion of the $1^{st}$-$(2^N)^{th}$ pages into $(2^N+1)^{th}$-$(2^N+M)^{th}$ pages.

According to yet another embodiment of the present invention, a method for accessing a flash memory is disclosed, wherein a block of the flash memory includes $(2^N+M)$ pages, and $(2^N+1)^{th}$-$(2^N+M)^{th}$ pages are arranged for backing up data of a portion of $1^{st}$-$(2^N)^{th}$ pages, and both of N and M are positive integers. The method comprises: reading data of at least one page from the portion of the pages into $1^{st}$-$(2^N)^{th}$ pages; and selectively reading pages arranged for backing up the at least one page from the $(2^N+1)^{th}$-$(2^N+M)^{th}$ pages to act as data of at least one page.

According to still yet another embodiment of the present invention, a memory device is disclosed. The memory device includes a flash memory and a controller. The flash memory includes a plurality of blocks, and each of the blocks including $(2^N+M)$ pages, and $(2^N+1)^{th}$-$(2^N+M)^{th}$ pages are arranged for backing up data of a portion of $1^{st}$-$(2^N)^{th}$ pages, and both of N and M are positive integers. The controller is arranged for selectively reading pages arranged for backing up the at least one page from the $(2^N+1)^{th}$-$(2^N+M)^{th}$ pages to act as data of at least one page.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
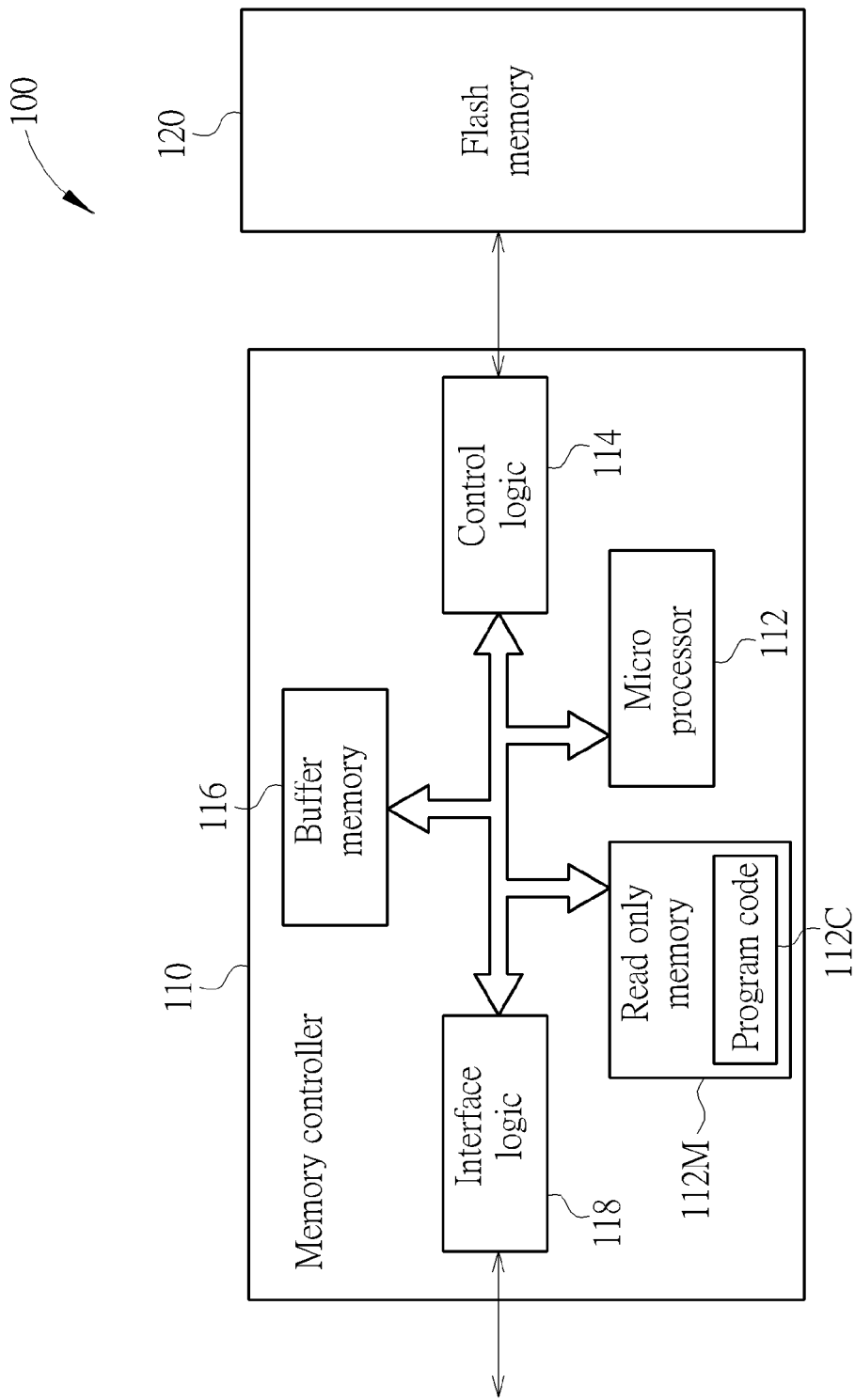
FIG. 1 is a diagram illustrating a memory device according to an embodiment of the present invention.

Please refer to FIG. 1, which is a diagram illustrating a memory device 100 according to an embodiment of the present invention. The memory device 100 in this embodiment is a portable memory device (e.g., a memory card complying with SD/MMC, CF, MS or XD standard). The memory device 100 includes a flash memory 120 and a controller, wherein the controller may be a memory controller 110, and is arranged for accessing the flash memory 120. According to this embodiment, the memory controller 110 includes a micro processor 112, a read only memory (ROM) 112M, a control logic 114, a buffer memory 116 and an interface logic 118. The ROM 112M is arranged for storing a program code 112C, and the micro processor 112 is arranged for executing the program code 112C to control access of the flash memory 120.

In a typical case, the flash memory 120 includes a plurality of blocks, and the controller (e.g., the memory controller 110, which executes the program code 112C through the micro processor 112) performs block-based copying process, erasing process, merging process, etc. upon the flash memory 120. Further, a specific number of pages can be recorded in a block, where the controller (e.g., the memory controller 110, which executes the program code 112C through the micro processor 112) performs page-based data writing process upon the flash memory 120.

In practice, the memory controller 110, which executes the program code 112C through the micro processor 112, may utilize built-in components to carry out a lot of control operations. For instance, the control logic 114 is utilized to control the access of the flash memory 120 (more particularly, the access of at least one block or at least one page), the buffer memory 116 is utilized to carry out the desired buffer process, and the interface logic 118 is utilized to communicate with a host device.

Figure 2:
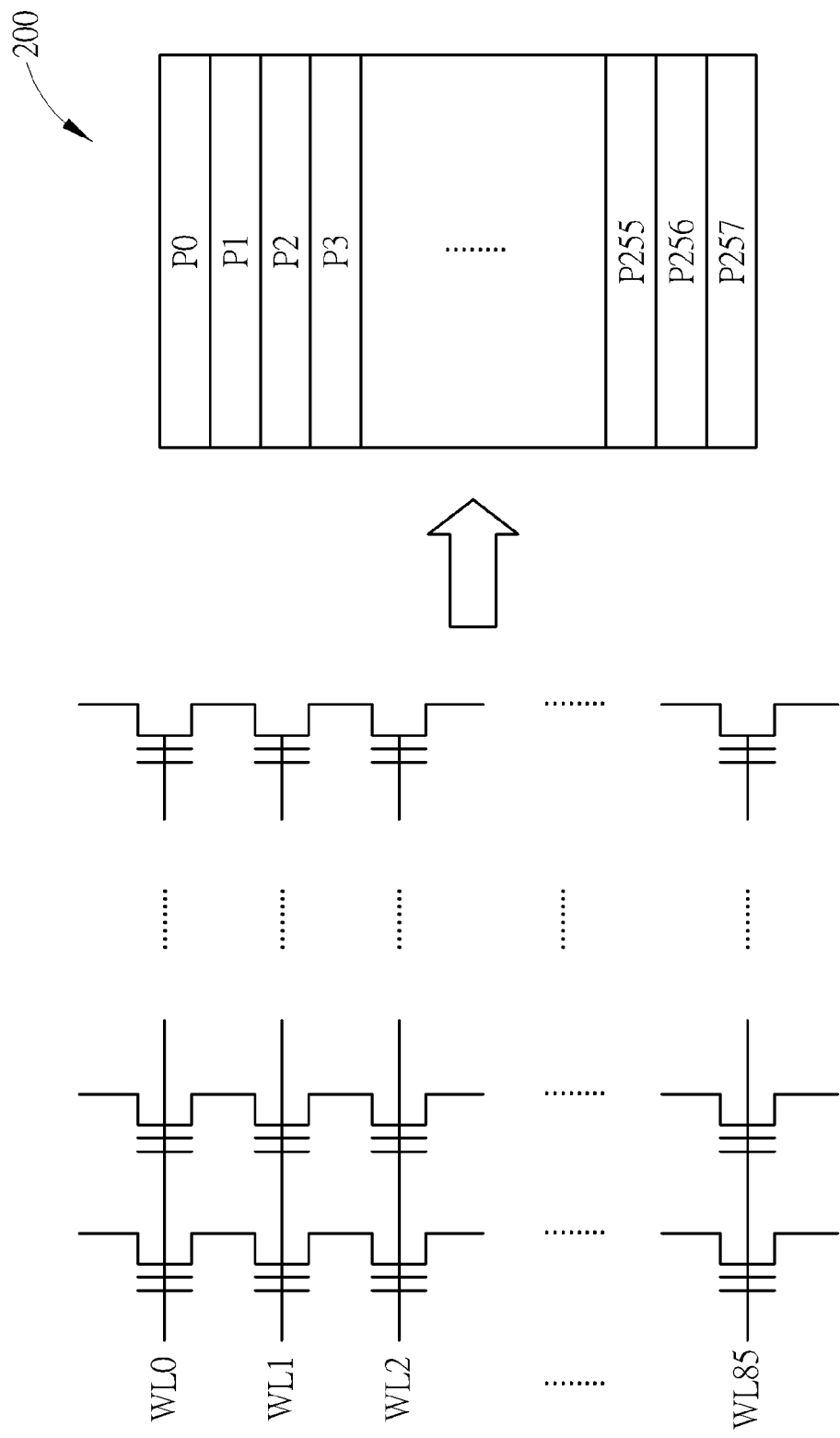
FIG. 2 is a diagram illustrating a block in a flash memory according to an embodiment of the present invention.

Please refer to FIG. 2, which is a diagram illustrating a block 200 in a flash memory 120 according to an embodiment of the present invention. As shown in FIG. 2, the block 200 is a TLC. That is to say, each of the storage units (i.e. each of the transistors) has storage capacity of three bits. The block 200 possesses 86 word line WL0-WL85, where each word line constitutes three pages. Hence, the block 200 has total 258 pages P0-P257. In the following paragraphs, the block size shown in FIG. 2 is employed for illustrating features of the present invention. However, this is for illustrative purposes only, and is not meant to be a limitation of the present invention. In other embodiments of the present invention, the block 200 may have a different number of pages.

Figure 3:
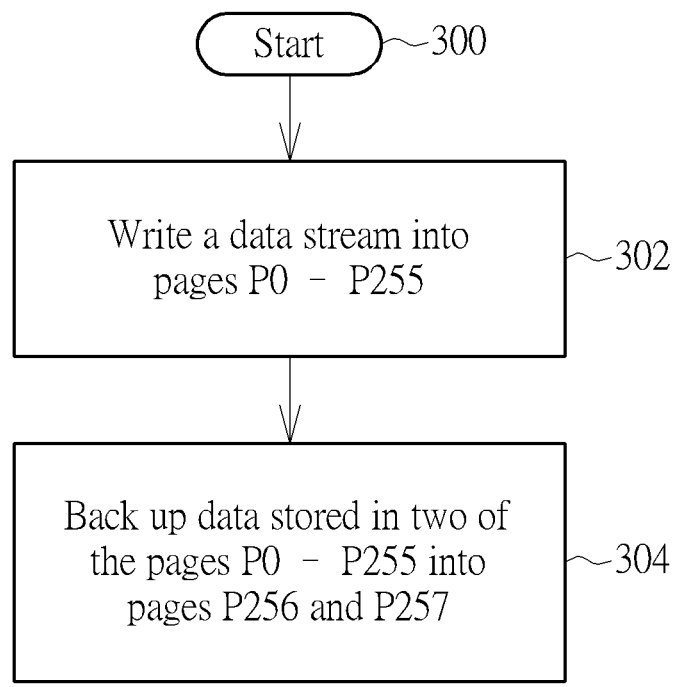
FIG. 3 is a flowchart illustrating a method of writing data into a flash memory according to an embodiment of the present invention.
Figure 4:
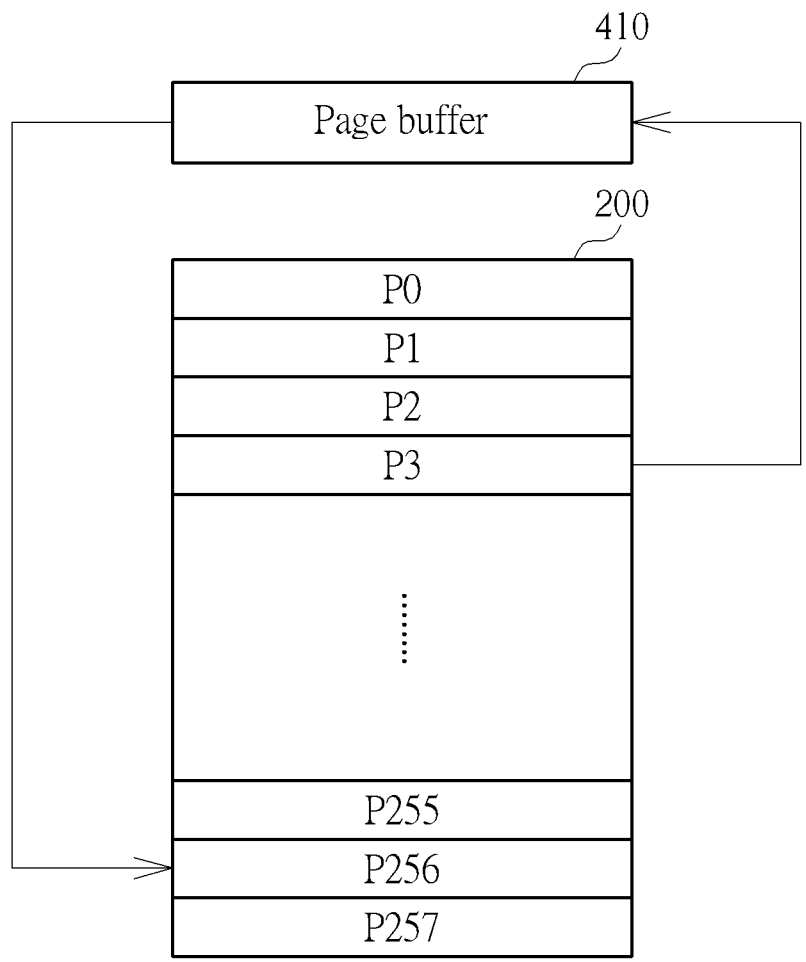
FIG. 4 is a diagram illustrating backing up data in the block.

Please refer to FIG. 3 and FIG. 4 in conjunction with FIG. 1. FIG. 3 is a flowchart illustrating a method of writing data into a flash memory according to an embodiment of the present invention. FIG. 4 is a diagram illustrating backing up data in the block 200. The flow in FIG. 3 is described as follows.

In step 300, the flow starts. Next, in step 302, the memory controller 110 writes a data stream into pages P0-P255 of block 200, sequentially. After writing the data stream into the pages P0-P255, the flow enters step 304. In step 304, the memory controller 110 backs up data stored in two of the pages P0-P255 into pages P256 and P257.

Specifically, in step 304, the memory controller 110 can determine data in which two pages should be backed up into the pages P256 and P257 according to predefined location information. The predefined location information may bb determined by a designer according to the quality of the flash memory 120 or other testing data. That is to say, the predefined location information can be utilized to indicate which two pages in the pages P0-P255 have poor storage quality. In an embodiment of the present invention, because the block 200 is a TLC, each of the word lines WL0-WL85 of the block 200 includes a Most Significant Bit Page (MSB page), a Central Significant Bit Page (CSB page) and a Least Significant Bit Page (LSB page). In addition, since the MSB pages usually have higher error rate, the memory controller 110 may back up data corresponding to MSB pages of two word lines into the pages 256 and 257, or backing up data corresponding to CSB pages of two word lines into the pages 256 and 257, or backing up data corresponding to a CSB page and an LSB page of one or two word lines into the pages 256 and 257.

Furthermore, with respect to backing up data of two pages in the pages P0-P255 into the pages P256 and P257, please refer to FIG. 4. Suppose data of the page P3 needs to be backed up into the page P256. The memory controller 110 may copy the data of the page P3 to the page buffer 410 in accordance with a copy-back command, and then copy the data in the page buffer 410 to the page P256. Next, it is followed by backing up data of another page into the page P257 in the same manner. Besides, in another embodiment of the present invention, the memory controller 110 may also copy the data of the page P3 to the page buffer 410 in accordance with a normal read/write command, transfer the copied data to the buffer in the memory controller 110, and then write the buffered data from the memory controller 110 into the page P256.

In summary, since the pages P256 and P257 in the block 200 may be utilized for data back-up, the capacity of the block 200 therefore is completely exploited when compared with the prior art design.

In addition, the embodiments shown in FIG. 2-FIG. 4 are for illustrative purposes only, and are not meant to be limitations of the present invention. In other embodiments of the present invention, as long as the number of pages of a block is $(2^N+M)$ and the memory controller 110 backs up data of a portion of the $1^{st}$-$(2^N)^{th}$ pages into the $(2^N+1)^{th}$-$(2^N+M)^{th}$ pages, appropriate modifications may be made to the proposed flow in the present invention. These alternative designs all belong to the scope of the present invention.

Figure 5:
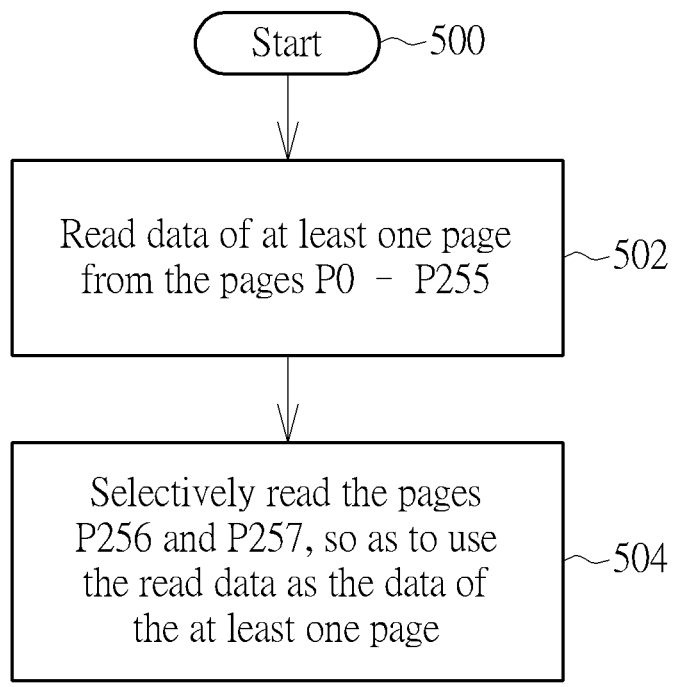
FIG. 5 is a flowchart illustrating a method of reading data from a flash memory according to an embodiment of the present invention.

Next, please refer to FIG. 5 in conjunction with FIG. 1 and FIG. 2. FIG. 5 is a flowchart illustrating a method of reading data from a flash memory according to an embodiment of the present invention. The flow in FIG. 3 is followed by the descriptions below with respect to FIG. 5, that is to say, the flow shown in FIG. 5 is to read data from the block 200, where the pages P256 and P257 in the block 200 have backed up data in two pages of the pages P0-P255. The flow in FIG. 5 is described as follows.

In step 500, the flow starts. Next, in step 502, the memory controller 110 reads data of at least one page from the pages P0-P255 in accordance with a command, wherein the data of the at least one page is backed up in the page P256 or P257. Then, in step 504, the memory controller 110 selectively reads the pages P256 and P257 according to condition of reading the at least one page, so as to use the read data as the data of the at least one page.

Specifically, in step 504, suppose that the page P256 possesses backup data of the page P3, and the memory controller 110 reads the page P3. If the memory controller 110 determines the page P3 is not able to be successfully read (i.e. the desired data is seriously damaged and the error correction code is not able to recovery it), or it takes too long to recover the data of the page P3 by error correction code and therefore exceeds a predetermined time period, the memory controller 110 may directly read the data in the page P256 to be the data of the page P3. Furthermore, if the memory controller has successfully read the data of the page P3, there is no need to read the page P256 in such a case.

The present invention may be briefly summarized as follows. With respect to the method for accessing a flash memory according to the present invention, data of a portion of the $1^{st}$-$(2^N)^{th}$ pages of a block is backed up into the $(2^N+1)^{th}$-$(2^N+M)^{th}$ pages. Therefore, each of pages in the block can be fully utilized. In addition, when the data of the portion of the $1^{st}$-$(2^N)^{th}$ pages has error bits and cannot be read successfully, it is possible to recover the data by referring to the backup data in the $(2^N+1)^{th}$-$(2^N+M)^{th}$ pages, thus achieving faster and more accurate data access of the flash memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a flash memory, wherein a number of entire pages of a block of the flash memory is $(2^N+M)$ and is not an integer power of two, last M pages are arranged for backing up data of a portion of first $(2^N)$ pages, and both of N and M are positive integers, the method comprising:

reading data of at least one page from the portion of the first ($2^N$) pages of the block; and selectively reading page(s) arranged for backing up the at least one page from the last M pages of the block to act as data of the at least one page;

wherein the step of selectively reading the page(s) arranged for backing up the at least one page from the last M pages comprises:

determining whether required time for reading data of the at least one page exceeds a predetermined time period; and when it is determined that the required time for reading the data of the at least one page exceeds the predetermined time period, reading the page(s) arranged for backing up the at least one page from the last M pages to act as the data of the at least one page.

2. The method of claim 1, wherein the flash memory is a triple-level cell (TLC) flash memory.

3. A memory device, comprising:

a flash memory, comprising a plurality of blocks, a number of entire pages of each block is ($2^N$+M) and is not an integer power of two, wherein last M pages are arranged for backing up data of a portion of first ($2^N$) pages, and both of N and M are positive integers; and a controller, arranged for selectively reading page(s) arranged for backing up the at least one page from the last M pages to act as data of the at least one page;

wherein the controller determines whether required time for reading data of the at least one page exceeds a predetermined time period, and when it is determined that the required time for reading the data of the at least one page exceeds the predetermined time period, the controller reads the page(s) arranged for backing up the at least one page from the last M pages to act as the data of the at least one page.

4. The memory device of claim 3, wherein the flash memory is a triple-level cell (TLC) flash memory.

* * * * *